(12) United States Patent
Chamoun et al.

(10) Patent No.: US 11,965,793 B2
(45) Date of Patent: Apr. 23, 2024

(54) STRESS ENGINEERING OF TRANSPARENT MATERIALS

(71) Applicant: Palo Alto Research Center Incorporated, Palo Alto, CA (US)

(72) Inventors: Jacob Chamoun, Stanford, CA (US); Mahati Chintapalli, Mountain View, CA (US); David K. Biegelsen, Portola Valley, CA (US)

(73) Assignee: Xerox Corporation, Norwalk, CT (US)

( * ) Notice: Subject to any disclaimer, the term of this patent is extended or adjusted under 35 U.S.C. 154(b) by 353 days.

(21) Appl. No.: 17/324,038

(22) Filed: May 18, 2021

(65) Prior Publication Data
US 2022/0373411 A1    Nov. 24, 2022

(51) Int. Cl.
*G01L 5/00* (2006.01)
*G01J 4/00* (2006.01)
*G01L 1/24* (2006.01)

(52) U.S. Cl.
CPC .............. *G01L 5/0076* (2013.01); *G01J 4/00* (2013.01); *G01L 1/24* (2013.01)

(58) Field of Classification Search
CPC . G02B 1/14; G02B 1/115; G02B 5/30; G02B 5/305; G02B 5/3033; G02B 1/11; G02B 1/18; G02B 5/3041; G02B 5/3083; G02B 5/28; G02B 5/3025; G02B 1/04; G02B 6/02033; G02B 1/02; G02B 2006/12038; G02B 2006/12073; G02B 5/0278; G02B 6/0281; G02B 6/036; G02B 6/03627; G02B 6/03655; G02B 6/03683; G02B 5/021; G02B 5/208; G02B 5/285; G02B 6/0065; G02B 30/25; G02B 5/0236;
(Continued)

(56) References Cited

U.S. PATENT DOCUMENTS 3,811,775 A * 5/1974 Abu-Saud .............. G01L 1/241
                                                    356/34
4,610,863 A    9/1986 Tewari et al.
(Continued)

FOREIGN PATENT DOCUMENTS

CN    203432781 U  *  2/2014
CN    111386449 A  *  7/2020 ............. G01L 1/24
(Continued)

OTHER PUBLICATIONS

Tang et al., "Programmable active kirigami metasheets with more freedom of actuation", PNAS, Dec. 26, 2019, vol. 116, No. 52, 26407-26413.
(Continued)

*Primary Examiner* — Michael P Stafira
(74) *Attorney, Agent, or Firm* — Ortiz & Lopez, PLLC; Luis M. Ortiz; Kermit D. Lopez

(57) ABSTRACT

A method and system for stress engineering of a transparent material can include an imaging system that can visualize a spatial distribution of an internal stress in a transparent material, an actuator system that can induce stress in the transparent material, the actuator system comprising one or more actuator elements, and a feedback system that can communicate with the imaging system and the actuator system, and which can guide an internal stress distribution in the transparent material toward a preferred final state.

7 Claims, 6 Drawing Sheets

(58) Field of Classification Search
CPC .... G02B 5/0294; G02B 5/205; G02B 5/3016; G02B 1/111; G02B 1/118; G02B 2006/12088; G02B 2006/1209; G02B 26/00; G02B 27/0006; G02B 5/0883; G02B 5/289; G02B 6/0011; G02B 6/0068; G02B 6/0073; G02B 6/0088; G02B 6/0091; G02B 6/02009; G02B 6/02395; G02B 6/0288; G02B 6/03605; G02B 6/12; G02B 6/12002; G02B 6/3829; G02B 1/16; G02B 2207/107; G02B 27/01; G02B 27/08; G02B 27/281; G02B 27/286; G02B 27/42; G02B 5/045; G02B 5/08; G02B 5/223; G02B 6/0041; G02B 6/0043; G02B 6/006; G02B 6/03694; G02B 6/122; G02B 6/1345; G02B 6/255; G02B 6/3834; G02B 6/3854; G02B 6/3855; G02B 6/3858; G02B 6/3861; G02B 6/4239; G02B 1/00; G02B 1/10; G02B 2027/0178; G02B 27/017; G02B 27/0176; G02B 27/4277; G02B 3/08; G02B 5/0242; G02B 5/0257; G02B 5/0833; G02B 5/1814; G02B 5/1833; G02B 5/1866; G02B 5/20; G02B 5/201; G02B 5/286; G02B 5/3075; G02B 6/005; G02B 6/0056; G02B 6/0085; G02B 6/3544; G02B 6/3594; G01J 4/00; G01J 3/0291; G01J 3/0208; G01J 3/447; G01J 3/4531; G01J 4/04; G01J 2003/1291; G01J 2003/452; G01J 3/02; G01J 3/0224; G01J 3/0229; G01J 3/0237; G01J 3/0256; G01J 3/28; G01J 3/2803; G01J 3/2823; G01J 3/45; G01B 11/18; G01B 11/168

See application file for complete search history.

(56) References Cited

U.S. PATENT DOCUMENTS

| 6,985,214 | B2 | 1/2006 | Szaroletta et al. |
| 7,092,092 | B1 | 8/2006 | Johnston |
| 7,147,701 | B2 | 12/2006 | Risen et al. |
| 7,430,038 | B2 | 9/2008 | Szaroletta et al. |
| 8,435,432 | B2 | 5/2013 | Sasada |
| 9,218,660 | B2 | 12/2015 | Carrola, Jr. et al. |
| 10,001,444 | B2* | 6/2018 | Ko .................... G01N 21/9501 |
| 10,491,788 | B2* | 11/2019 | Hartrumpf ............ G06T 7/0008 |
| 10,563,035 | B2 | 2/2020 | Steiner, III et al. |
| 2010/0081123 | A1 | 4/2010 | Abbott et al. |
| 2012/0314202 | A1 | 12/2012 | Danyluk et al. |
| 2018/0080770 | A1 | 3/2018 | Chamoun et al. |
| 2018/0224341 | A1* | 8/2018 | Sakamoto ................. G01L 1/24 |
| 2019/0376909 | A1* | 12/2019 | Hegstrom ........ G05B 19/41875 |
| 2020/0064197 | A1* | 2/2020 | Furnas .................... G01B 11/08 |
| 2020/0180334 | A1 | 6/2020 | Pirmoradi et al. |
| 2021/0040256 | A1 | 2/2021 | Chintapalli et al. |
| 2021/0053377 | A1 | 2/2021 | Pirmoradi et al. |

FOREIGN PATENT DOCUMENTS

| JP | 6419595 B2 * | 11/2018 |
| WO | WO-2020118507 A1 * | 6/2020 |

OTHER PUBLICATIONS

Chien-Yuan Han, et al., "A Novel Technique to Examine the Optical Properties and Stress of Thin Films", Downloaded on Dec. 7, 2020 at 19:10:39 UTC from IEEE Xplore.

Liyuan Gu, Aijun Zeng, Shiyu Hu, Qiao Yuan, Weilin Cheng, Shanhua Zhang, Guohang Hu, Hongbo He, Huijie Huang, "Imaging ellipsometer with large field of-view," Proc. SPIE 10023, Optical Metrology and Inspection for Industrial Applications IV, 1002315 (Nov. 24, 2016); doi: 10.1117/12.2247848; Event: SPIE/COS Photonics Asia, 2016, Beijing, China.

Ausra Cerkauskaite, et al., "Ultrafast laser-induced birefringence in various porosity silica glasses: from fused silica to aerogel", vol. 25, No. 7 | Apr. 3, 2017 | Optics Express 8011.

F. Boccafoschi, et al., "Effects of mechanical stress on cell adhesion, a possible mechanism for morphological changes", Cell Adhesion & Migation 4:1, 19-25; Jan./Feb./Mar. 2009.

Pradeep Bhupathi, et al., "Aerogel Waveplates", 2009.

Ece Bayir, et al., "Mechanobiology of cells and cell systems, such as organoids", Biophysical Reviews (2019) 11:721-728, https://doi.org/10.1007/s12551-019-00590-7.

Gregory H. Altman, et al., "Cell differentiation by mechanical stress", The FASEB Journal express article 10.1096/fj.01-0656fje. Published online Dec. 28, 2001.

Accurion, Solutions for Science, Compendium, Principles of Nulling and Imaging Ellipsometry.

* cited by examiner

STRESS ENGINEERING OF TRANSPARENT MATERIALS

TECHNICAL FIELD

Embodiments relate to methods and systems for engineering internal stresses in transparent materials.

BACKGROUND

Polymers can develop internal stresses as they form. In some cases these stresses may be a nuisance because they generate cracks or warps when forming large sheets, as would be needed for a windowpane application. In other cases the stresses may be desirable, such as a stress in a cell scaffold for an artificial organ, where mechanical stress can induce differentiation or encourage cell adhesion. Another area involves an engineered stress distribution in an initially planar material that can generate a controlled folding to a 3D structure as in kirigami micromachines or an adaptable bandage.

A problem stemming from the development of internal stresses involves how to detect the stress in a transparent polymer as it is forming and control the evolution of the stress distribution towards a final desired state in the cured polymer.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for methods and systems for stress engineering of transparent materials.

It is another aspect of the disclosed embodiments to provide for methods and systems for detecting the stress in a transparent polymer as it forms and controlling the evolution of the stress distribution towards a final desired state in the cured polymer.

It is also an aspect of the disclosed embodiments to provide for methods and systems for measuring and modifying the stress distribution in a transparent polymer while it is formed in order to guide the final stress distribution to a desired state.

The aforementioned aspects and other objectives and advantages can now be achieved as described herein. In an embodiment, a system for stress engineering of a transparent material, can include an imaging system that visualizes a spatial distribution of an internal stress in a transparent material, an actuator system that can induce stress in the transparent material, the actuator system including one or actuator elements, and a feedback system that can communicate with the imaging system and the actuator system, and which can guide an internal stress distribution in the transparent material toward a preferred final state.

In an embodiment of the system, the transparent material can comprise a polymer.

In an embodiment of the system, the imaging system can comprise a polariscope comprising a polarized light source that illuminates the transparent material, and a polarization analyzer that converts a stress-birefringence induced polarization change from the transparent material into an intensity modulation.

In an embodiment of the system, the imaging system can comprise a tint plate that converts a stress-birefringence induce polarization change from the transparent material to a hue change.

In an embodiment of the system, the imaging system can comprise a polariscope comprising a polarized light source that illuminates the transparent material, a polarization analyzer that converts a stress-birefringence induced polarization change from the transparent material into an intensity modulation, and a tint plate that converts a stress-birefringence induce polarization change from the transparent material to a hue change.

In an embodiment of the system, the imaging system can comprise a strain viewer.

In an embodiment of the system, the actuator system can be coupled to the transparent material.

In an embodiment of the system, the actuator system can include one or more of a global actuator, a point actuator with or without one-dimensional scanning or two-dimensional scanning, a one-dimensional array of actuators with or without one-dimensional scanning, or a two-dimensional array of actuators.

In an embodiment of the system, each of the one or more actuator elements may be, for example, a mechanical actuator, a heater, a light spot, a jet of air or chemical vapor, a particle beam, a vacuum, or a solvent-dispensing nozzle.

In an embodiment of the system, a lock-in method of polarimetry can be utilized to mask the effects of blackbody radiation and increase the signal-to-noise ratio of stress measurements to enable adjusting the internal stress distribution for temperatures up to and including approximately 3000 K.

In an embodiment, a method for stress engineering of a transparent material, can involve: visualizing with an imaging system, a spatial distribution of an internal stress in a transparent material; inducing with an actuator system, stress in the transparent material, the actuator system comprising at least one actuator element; and guiding with a feedback system, an internal stress distribution in the transparent material toward a preferred final state, wherein the feedback system communicates with the imaging system and actuator system.

In an embodiment of the method, the transparent material may be a polymer.

In an embodiment of the method, the imaging system can include a polariscope comprising a polarized light source that illuminates the transparent material; a polarization analyzer that converts a stress-birefringence induced polarization change from the transparent material into an intensity modulation; and a tint plate that converts a stress-birefringence induce polarization change from the transparent material to a hue change.

In an embodiment of the method, the imaging system can comprise a strain viewer.

In an embodiment of the method, the actuator system can be coupled to the transparent material.

In an embodiment of the method, the actuator system can include one or more of a global actuator, a point actuator with or without one-dimensional scanning or two-dimensional scanning, a one-dimensional array of actuators with or without one-dimensional scanning, or a two-dimensional array of actuators.

In an embodiment of the method, each of the one or more actuator elements may be, for example, a mechanical actuator, a heater, a light spot, a jet of air or chemical vapor, a particle beam, a vacuum, or a solvent-dispensing nozzle.

In an embodiment of the method, a lock-in method of polarimetry can be utilized to mask the effects of blackbody radiation and increase the signal-to-noise ratio of stress measurements to enable adjusting the internal stress distribution for temperatures up to and including approximately 3000 K.

In another embodiment, a system for stress engineering of a transparent material, can include at least one processor and a memory, the memory storing instructions to cause the at least one processor to perform: visualizing with an imaging system, a spatial distribution of an internal stress in a transparent material; inducing with an actuator system, stress in the transparent material, the actuator system comprising at least one actuator element; and guiding with a feedback system, an internal stress distribution in the transparent material toward a preferred final state, wherein the feedback system communicates with the imaging system and actuator system.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the embodiments.

DETAILED DESCRIPTION

Figure 1:
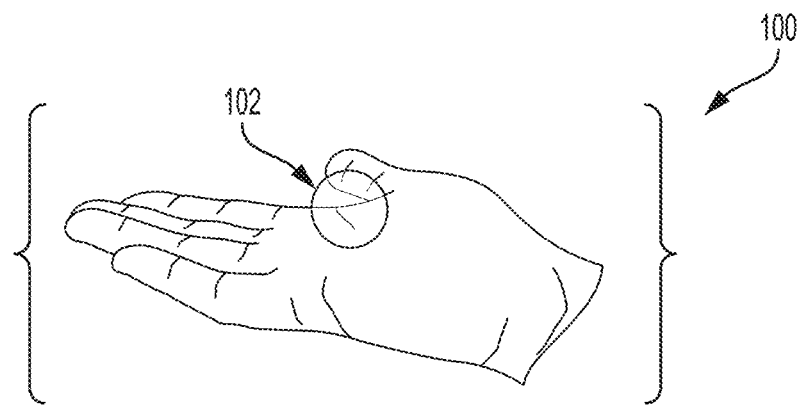
FIG. 1 illustrates an image of a transparent aerogel, which is an example of a transparent structural polymer that can be adapted for use with an embodiment.

The particular values and configurations discussed in these non-limiting examples can be varied and are cited merely to illustrate one or more embodiments and are not intended to limit the scope thereof. Exemplary embodiments are intended to cover all alternatives, modifications, and equivalents as may be included within the spirit and scope of the composition, apparatus and systems as described herein.

A more complete understanding of the processes, systems and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof. In the drawing, like reference numerals may be used throughout to designate similar or identical elements.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in an embodiment" or "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter can include combinations of embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The modifier "about" used in connection with a quantity may be inclusive of the stated value and can have a meaning dictated by the context (for example, it may include at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations. The terms "first," "second," and the like, herein do not denote any order, quantity, or importance, but rather can be used to distinguish one element from another. The terms "a" and "an" herein may not denote a limitation of quantity, but rather can denote the presence of at least one of the referenced item. Furthermore, the term "at least one" as utilized herein may refer or relate to "one or more", the term "at least two" as utilized herein may refer or relate to "two or more", and so on.

The disclosed embodiments involve measuring and modifying the stress distribution in a transparent polymer while it is formed in order to guide the final stress distribution to a desired state. FIG. 1 illustrates an image 100 of a transparent aerogel 102, which is an example of a transparent structural polymer that can be adapted for use with one or more embodiments.

Note that ellipsometry is a mature technique for analyzing thin films based on the polarization change of light that is reflected off the film. Ellipsometry is good for measuring relatively large stress (GPa) in thin films (e.g., <1 nm up to several microns) and small areas (e.g., 1 cm$^2$). Real-time spectral ellipsometry (RTSE) can be used analyze the properties of thin films in real time and in-situ as the film is formed. Imaging ellipsometry can generate spatially resolved depth or index maps. Ellipsometry data is more difficult, however, to interpret for an anisotropic sample (e.g. a stress birefringent sample).

The disclosed embodiments are different from the aforementioned ellipsometry technique in that they are based on a polarization change on transmission through the sample (and thus requires a transparent sample). Furthermore, the disclosed embodiments can be targeted at polymers with lower stress, thicker samples (e.g., 10 um-10 mm), and much larger areas (e.g., m$^2$) compared to thin films.

Stress viewers can be used for inspecting glass and plastic parts after manufacture, but are less common to use during forming. Strained aerogels have been used as waveplates to controllably induce a polarization change in a light beam, but in this case the aerogel can act as an optical component, not a structural polymer.

Stress birefringence has been induced in silica structures, including silica aerogels, using femtosecond laser pulses, however these modifications all take place after the aerogel is formed and not during manufacture. Also, the size of the structures (e.g., >5 um) may induce scattering so the aerogel may not be transparent after exposure.

Figure 2:
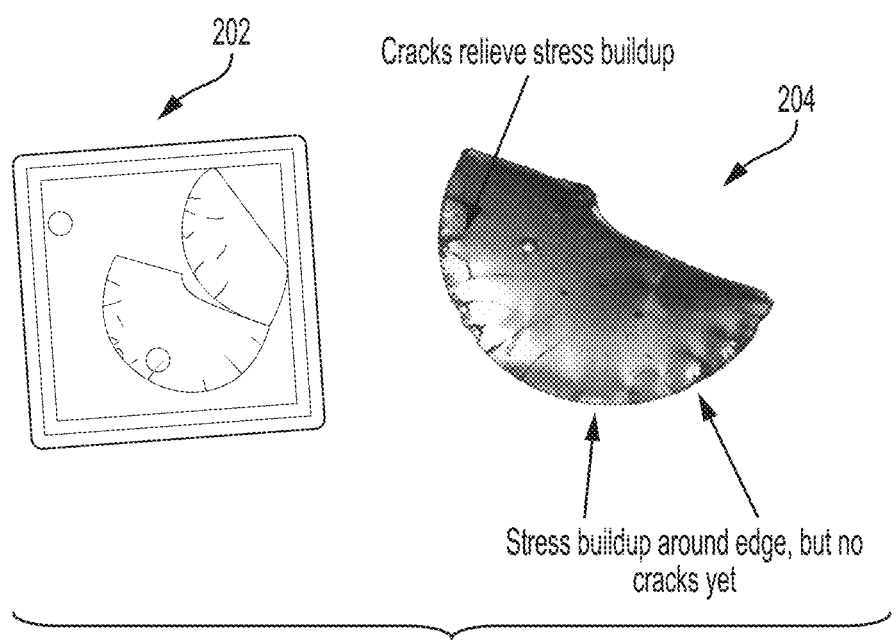
FIG. 2 illustrates images of a transparent aerogel viewed in ambient and through a polariscope to visualize stress birefringence.

FIG. 2 illustrates images of a transparent aerogel illuminated with white light and viewed with no intervening optics (i.e., see image 202) and through a polariscope (i.e., see image 204) to visualize stress birefringence. With no intervening optics, cracks can be seen around the edge of the sample. The polariscope image (204) reveals stress contours around the edge of the sample where cracks have yet to form. The visible cracks have low stress, because cracks relieve stress buildup. This figure demonstrates how a polariscope can reveal details of the stress distribution that are otherwise invisible.

Figure 3:
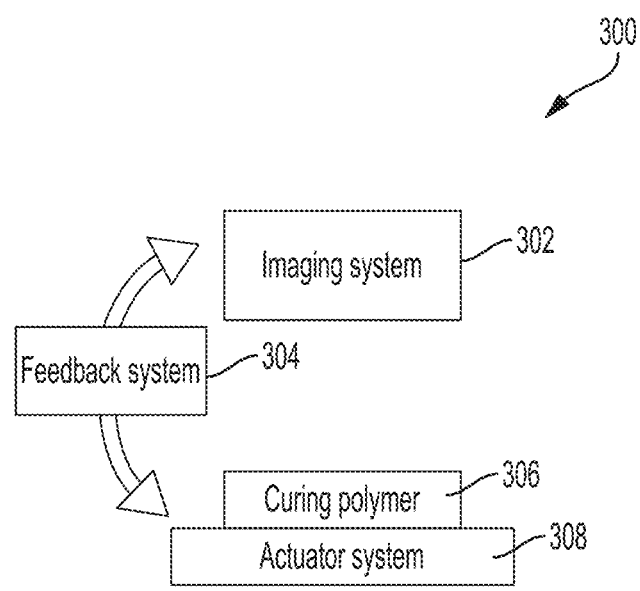
FIG. 3 illustrates a system for stress engineering of transparent materials, in accordance with an embodiment.

FIG. 3 illustrates a system 300 for stress engineering of transparent materials, in accordance with an embodiment. The system 300 can be implemented for engineering the internal stresses in a transparent polymer, polymer hybrid with another material class, or other material class as it forms. The system 300 can be based on three subsystems: an imaging system 302 to visualize the spatial distribution of internal stress in a transparent polymer, an actuator system 308 that can induce stress in a polymer 306 (e.g., a curing polymer), and a feedback system 304 between the imaging system 302 and the actuator system 306, which can guide the internal stress distribution towards a preferred final state.

In some embodiments, the imaging system 302 can be a polariscope, or a "strain viewer". A polariscope can include a polarized light source, for example, which can illuminate a sample in transmission, and a polarization analyzer, which can convert the stress-birefringence induced polarization change from the sample into an intensity modulation. Options can include a tint plate, which converts the signal from monochrome to RGB. Although visible wavelengths are shown here, this approach can also be applied using UV or IR light, provided that the camera is sensitive to these wavelengths, and all materials in the light path are transparent at these wavelengths. The area of the polymer sample can be anywhere from, for example, 10 μm$^2$, as for kirigami micromachines, to 10 m$^2$, as for window applications for transparent aerogels.

In an embodiment, a camera can be used to record the images that can encode the stress distribution. In this embodiment, the camera should have a high enough resolution to resolve the spatial scale of stress features of interest. For example, a 16 MP camera with a resolution of 4920×3264 px$^2$ imaging a 5×3 m2 area would have a resolution of around 1 mm, assuming a well-corrected imaging lens is used. If quantitative stress information may be required, a data processing chain may be optionally needed to convert the measured images to a stress distribution. Equation 1 below governs the relationship between stress and birefringence:

$$R = Ct(\sigma_{11} - \sigma_{22}) = \Delta nt \qquad \text{Eq. 1}$$

Where R [nm] is the retardance, C [nm/(mm*Pa)] is the material-dependent stress optic coefficient, t [mm] is the sample thickness, $\sigma_{11}$ and $\sigma_{22}$ are the local in-plane principal stresses, and $\Delta n$ is the birefringence.

Figure 4:
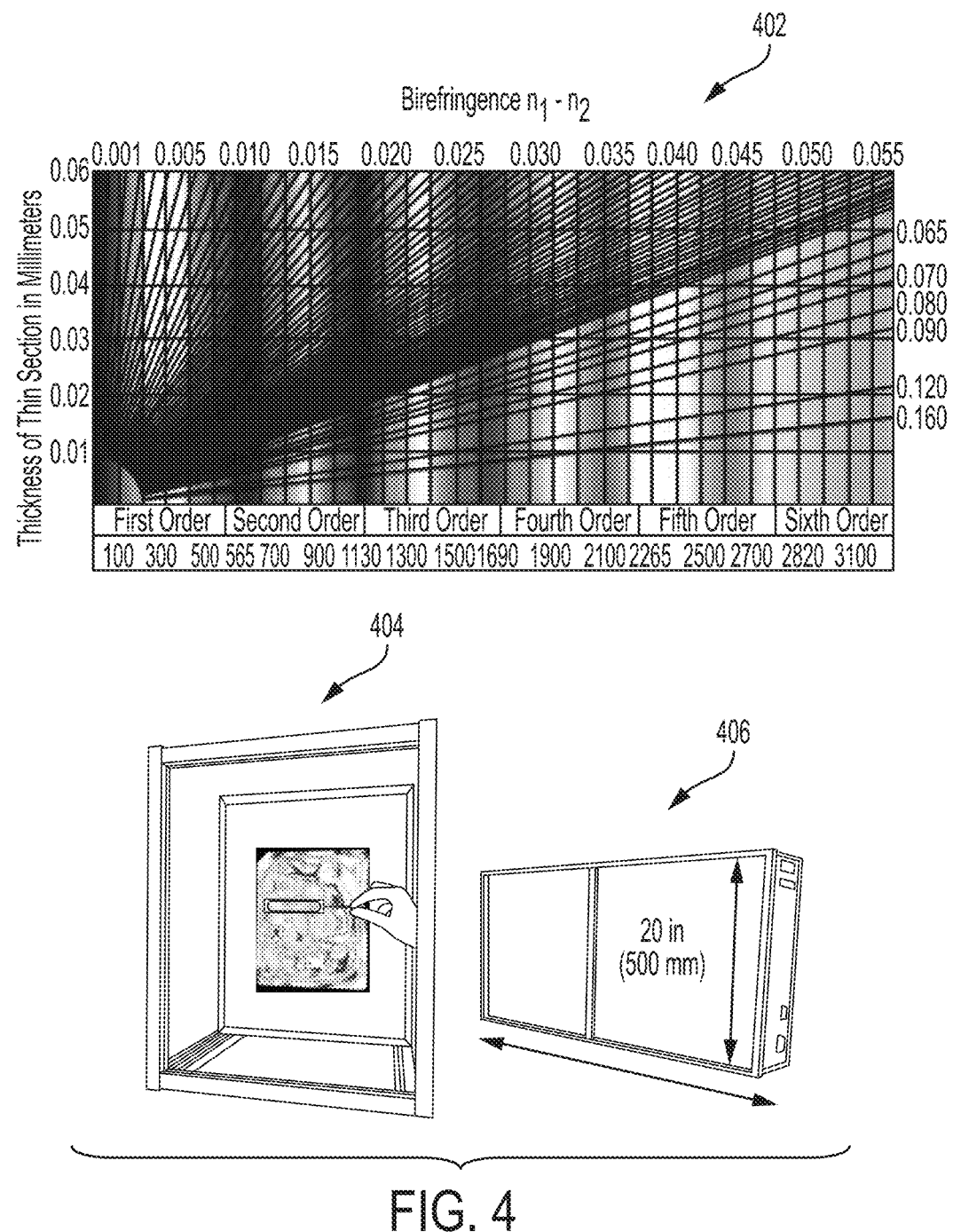
FIG. 4 illustrates a Michel-Levy interference color chart, and images depicting example commercial off the shelf large area polariscopes, which can be adapted for use in accordance with an embodiment.

FIG. 4 illustrates a Michel-Levy interference color chart 402, and images 404 and 406 depicting example commercial off the shelf large area polariscopes, which can be adapted for use in accordance with an embodiment. It should be appreciated that although the drawings provided herein are presented in black and white, the drawing in FIG. 4 is representative of a color chart and color is used in an implemented embodiment.

The birefringence can be read off of images using a Michel-Levy interference color chart 402 of the type depicted FIG. 4. The specific mapping of hue to birefringence may depend on the color temperature of illumination, so this may need to be calibrated for a specific illumination configuration. More sophisticated image processing routines can use fringe counting, phase unwrapping, or other techniques to more accurately determine the birefringence.

Polariscopes with a large area (e.g., ≈1 m$^2$) are available 'off the shelf' as shown in images 404 and 406, and this imaging technique may be straightforwardly scaled to larger or smaller areas.

The actuator system 308 may be coupled to the polymer 306 or a material forming method. Stress may develop in the material (e.g., the polymer or polymer aerogel) at any stage in the forming process. Forming processes may include curing, where chemical bonds may be formed between precursor materials, melt processing, solvent exchange steps, and drying steps. Any combination or subset of steps can be used to form the material. Curing may occur as a single step or in multiple steps (i.e. secondary curing), with or without introduction of new reactants at new steps.

Methods for curing can include: radiation curing (gamma ray, x-ray, ultraviolet, accelerated electron beams), thermal curing (radiation heating (infrared, laser and microwave), convection and conduction heating (hot gas, flame, oven and hot shoe), induction heating, ultrasonic heating, resistance heating and thermal additives (magnetic particles, NIR absorbent particles). Melt processing can occur at a temperature above the melting or glass transition temperature of the material, and can involve using pressure and external surfaces to achieve a shape.

Another forming process can involve solvent exchange. Polymer materials formulated with a solvent may be soaked in additional solvent of the same or different type for various reasons: inducing swelling or shrinkage before a secondary curing step, removing a solvent, reaction byproduct, or unreacted precursor, or exchanging a solvent. Polymers and polymer aerogels may also be dried during processing to remove volatile byproducts or solvents. Drying can occur by exposing the material to heat, vacuum, an atmosphere that is not saturated in the vapor of the component to be dried, a flow of dry air or gas, or by supercritical $CO_2$ drying (polymer is soaked or solvent exchanged with pressurized liquid $CO_2$ and then dried under supercritical conditions). Polymer forming steps often result in volume changes that can give rise to stresses.

Figure 5:
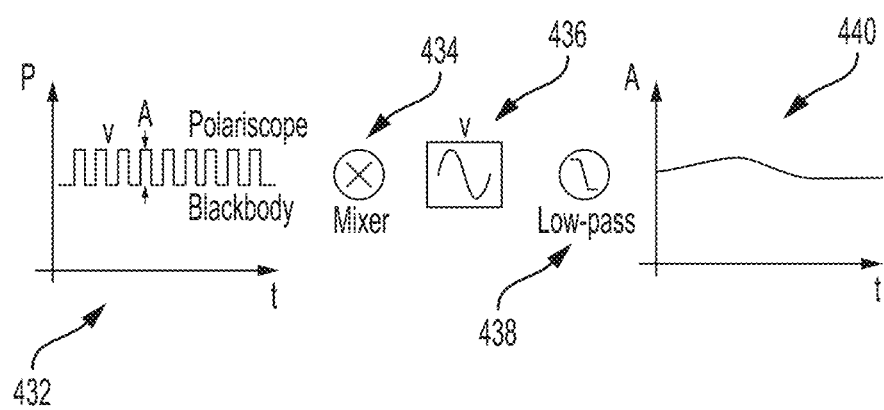
FIG. 5 illustrates graphs depicting a lock-in method that includes polariscope illumination modulated at a frequency, in accordance with an embodiment.

FIG. 5 illustrates a lock-in method as indicated by graphs 430 and 440, which demonstrate polariscope illumination modulated at a frequency, in accordance with an embodiment. In some embodiments, materials can be utilized, which may be formed at temperatures below, for example, 1450 K, where blackbody radiation is not dominant. For example, assume the 5×3 $m^2$ area polariscope described above is edge-illuminated around its perimeter using 2 W LEDs with a 1" pitch for a total of 600 W emitted. The same area emits 600 W of blackbody radiation in the 400-650 nm (VIS) wavelength band at around a temperature of 1450 K.

At higher temperatures, the (unpolarized, no-contrast) blackbody radiation can exceed the polariscope illumination. Extracting the stress signal, however, should still be possible in this case using a lock-in method as shown in FIG. 5. The polariscope illumination can be modulated at a frequency v. The detected power P at a given pixel of the camera shows an offset due to blackbody radiation and a modulated component at frequency with amplitude A. This signal can be mixed via a mixer 434 with a reference signal at a frequency 436 v and low-pass filtered via a low-pass filter 438 to provide A(t) with a high signal-to-noise ratio even if A is less than 1% of the blackbody component. This can allow the disclosed approach to be applied to temperatures up to 3000 K, well above the melting point of all types of glass. Thus, in an embodiment, a lock-in method of polarimetry can be utilized to mask the effects of blackbody radiation and increase the signal-to-noise ratio of stress measurements to enable adjusting the internal stress distribution for temperatures up to and including approximately 3000 K.

Some embodiments may apply to glass. While polymers and polymer aerogels are mentioned specifically, it should be appreciated that the disclosed embodiment can apply more broadly to any material set that shows partial or full transparency in the wavelength band of interest for detection.

During the forming process, the polymer 306 may be placed inside a process chamber, or on/in a substrate or mold, or other object. These are all referred to as external objects. The external object may or may not be inside the light path of the imaging system. If the external object is in the light path, the part that is in the light path should be at least partially transparent in the wavelength range of interest for detection. In addition, the part of the external object that is in the light path should ideally be isotropic or at least not have a spatially varying birefringence that would interfere with the measurement of the polymer sample.

Cracking and unwanted stresses may be alleviated in the forming steps by a variety of mechanisms. Cracking may have several causes: spatial inhomogeneity in volume changes during forming steps that lead to stress gradients, crack tip nucleation from geometric constraints or impurities (such as notches or sharp corners in the polymer shape), or by mismatch in volume changes between the polymer and an object it may be in contact with during the forming process (such as mold or substrate). Spatial inhomogeneity in volume changes can be exacerbated by processes that can lead to rapid changes in volume, as slow relaxation processes cannot occur to alleviate stress.

Actuation systems to prevent cracking or alleviate unwanted stress gradients can counter the mechanisms above. Actuations mechanisms can be mechanical, or chemo-physical. Examples of mechanical actuation mechanisms can involve applying compressive, tensile, or shear stresses, causing plastic deformation, or causing changes to the modulus of the material. Examples of chemical actuation including changing the rate of introduction of reactants, changing the rate of volume change during a forming process, changing the magnitude of the driving force behind a forming process, changing the rate of application of the driving force behind a forming process, removing the material from a mold or substrate, or initiating a new forming step.

Some examples of these general actuation processes include reducing the heating rate or temperature of polymerization during curing, dosing less irradiation to slow the initiation rate for a polymerization, increasing the amount of solvent vapor in a drying chamber during solvent evaporation to slow evaporation, compressing the material to increase its modulus to increase the energy barrier to crack nucleation or crack propagation, introducing filler material or precursor reactants to increase the modulus, cooling a material during drying to slow down solvent evaporation, heating a material during drying to decrease the surface tension of the evaporating solvent, heating a polymer during drying to homogenize the distribution of solvent, changing the pore size or porosity of the material to change the Laplace pressure (or resulting capillary stresses) during drying or solvent exchange, changing the pore size or porosity of the material to change the distribution of reactants or solvents during the forming process, and changing the concentration gradient of the solvent in the material to the solvent outside the material in a solvent exchange process, and changing the rate of convection or mass transport during drying.

The actuation mechanisms used to implement the actuator system 308 can be carried out by actuators and can be applied locally, in a pattern, or globally to the whole material. An actuator used with the actuator system 308 can be an array (e.g., a 2D array of pistons or heaters), or an image that can be projected onto the sample. Alternatively, the actuator may be a point actuator that can scan such as a laser spot, a nozzle that dispenses solvent, or a heater. An actuator used with the actuator system 308 may also be a device that can produce a change in stress in the polymer in a non-localized manner. An example of a global actuator used with the actuator system 308 is one that slows down a polymer forming process to enable non-actuated stress-equalization processes. For example, an actuator can introduce a high partial pressure of solvent vapor in a drying chamber to slow the rate of solvent evaporation relative to the rate of solvent re-distribution in the polymer 306.

Examples of actuators that can be used with the actuator system 308 include, for example, a global actuator, a point actuator with or without one-dimensional scanning or two-dimensional scanning, a one-dimensional array of actuators with or without one-dimensional scanning, or a two-dimensional array of actuators. The actuator system 308 may include individual actuators, examples of which include: a mechanical actuator, a heater, a light spot, a jet of air or chemical vapor, a particle beam, a vacuum, or a solvent-dispensing nozzle.

Figure 6:
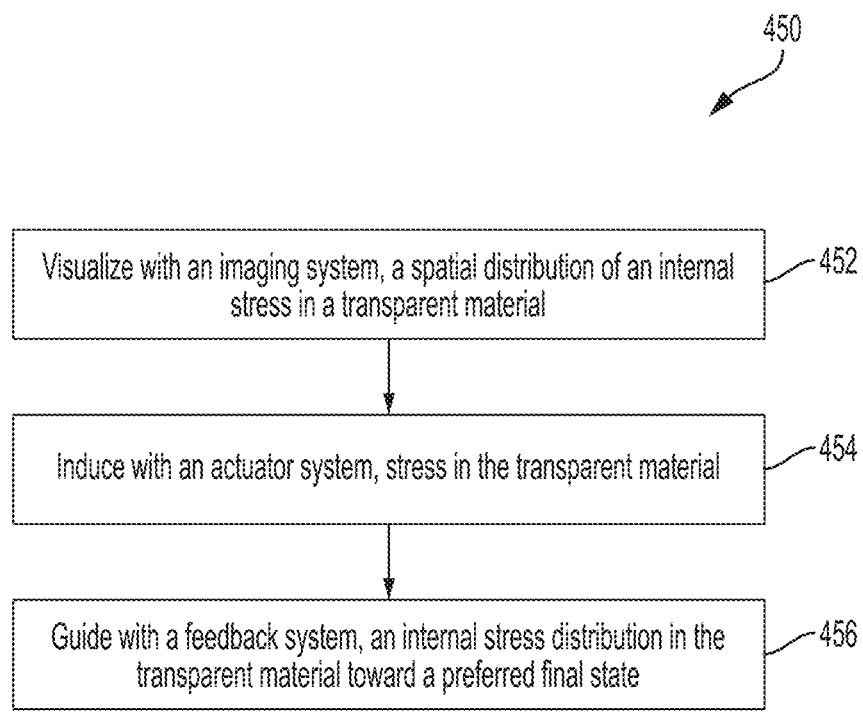
FIG. 6 illustrates a method of stress engineering of transparent materials, in accordance with an embodiment.

FIG. 6 illustrates a method 450 of stress engineering of transparent materials, in accordance with an embodiment. As depicted at block 452, a step or operation can be implemented to visualizing with the imaging system 302, a spatial distribution of an internal stress in a transparent material such as the material 306 shown in FIG. 3. Next, as depicted at block 454, a step or operation can be implemented to induce with the actuator system 308, stress in the transparent material 306. Thereafter, as depicted at block 456, a step or operation can be implemented to guide with the feedback system 304, an internal stress distribution in the transparent material 306 toward a preferred final state. As discussed previously herein, the feedback system 304 can communicate with the imaging system 302 and the actuator system 308.

Figure 7:
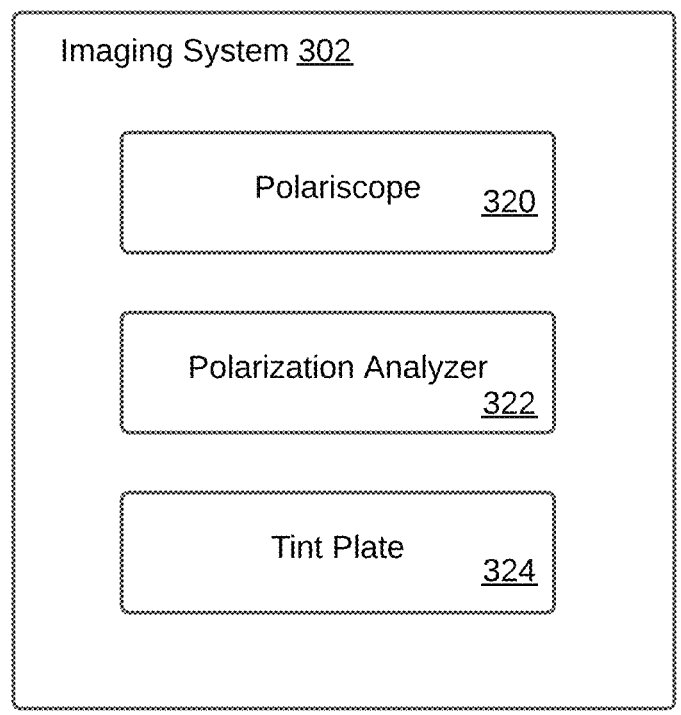
FIG. 7 illustrates a block diagram of an imaging system, in accordance with an embodiment.

FIG. 7 illustrates a block diagram of the imaging system 302, in accordance with an embodiment. The imaging system 30 can include a polariscope 320 comprising a polarized light source that illuminates the transparent material, and a polarization analyzer 322 that converts a stress-birefringence induced polarization change from the transparent material into an intensity modulation. The imaging system 302 can also include a tint plate 324 that converts a stress-birefringence induce polarization change from the transparent material to a hue change.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program. A data-processing apparatus such as a computer, is an example of a computer useable storage medium. The data-process apparatus can include, for example, one or more processors and a memory, the memory storing instructions to cause the one or more processors to perform or execute operations such as the various steps, instructions, operations depicted and described herein with respect to the blocks of method 450 depicted in FIG. 6.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), a digital video disk (DVD), Flash memory, and so on.

Alternatively, embodiments may be implemented entirely in hardware or in an implementation containing both hardware and software elements. In embodiments that do utilize software, the software may include but is not limited to firmware, resident software, microcode, etc.

In some alternative implementations of the embodiments, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The processors, engines, controllers, modules, transformations, units and other signal-generating and signal-processing features of the embodiments disclosed herein may be implemented in logic which, for example, may include hardware, software, or both. When implemented at least partially in hardware, the processors, engines, controllers, modules, transformations, units and other signal-generating and signal-processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the processors, engines, controllers, modules, transformations, units and other signal-generating and signal-processing features may include, for example, a memory or other storage device for storing code or instructions to be executed, for example, by a computer, processor, microprocessor, controller, or other signal processing device. The computer, processor, microprocessor, controller, or other signal-processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for stress engineering of a transparent material, comprising:
   visualizing with an imaging system, a spatial distribution of an internal stress in a transparent material;
   inducing with an actuator system, stress in the transparent material, the actuator system comprising at least one actuator element; and
   guiding with a feedback system, an internal stress distribution in the transparent material toward a preferred final state, wherein the feedback system communicates with the imaging system and actuator system.

2. The method of claim 1 wherein the transparent material comprises a polymer.

3. The method of claim 1 wherein the imaging system comprises:
   a polariscope comprising a polarized light source that illuminates the transparent material;
   a polarization analyzer that converts a stress-birefringence induced polarization change from the transparent material into an intensity modulation; and
   a tint plate that converts a stress-birefringence induce polarization change from the transparent material to a hue change.

4. The method of claim 1 wherein the imaging system comprises a strain viewer.

5. The method of claim 1 wherein the actuator system comprises a global actuator.

6. The method of claim 1 wherein the at least one actuator element of the actuator system comprises a mechanical actuator.

7. The method of claim 1 wherein a lock-in method of polarimetry is utilized to mask the effects of blackbody radiation and increase a signal-to-noise ratio of stress measurements to enable adjusting an internal stress distribution for temperatures up to and including approximately 3000 K.

* * * * *